ELECTRICAL MODULATORS

Filed Oct. 23, 1950 2 Sheets-Sheet 1

Inventors,
Thomas Harold Flowers,
John Edward Flood,
by Hall + Houghton,
Attorneys.

ELECTRICAL MODULATORS

Filed Oct. 23, 1950 2 Sheets-Sheet 2

Inventors,
Thomas Harold Flowers,
John Edward Flood,
by Hall & Houghton,
Attorneys.

United States Patent Office 2,716,731

Patented Aug. 30, 1955

2,716,731

ELECTRICAL MODULATORS

Thomas Harold Flowers, Mill Hill, London, and John Edward Flood, London, England Application October 23, 1950, Serial No. 191,584

Claims priority, application Great Britain November 1, 1949

17 Claims. (Cl. 332—9)

This invention relates to electric modulators and particularly to electric pulse modulators for time-division multiplex systems. Certain embodiments of the invention are particularly applicable to the switching system described in the specification of co-pending patent application, Ser. No. 56,619, date of filing October 26, 1948, Patent 2,666,809, granted January 19, 1954.

In this specification the term rectifier is used to describe any two-terminal apparatus presenting substantially different resistances to current flow between the two terminals for the two directions of current flow, for example a thermionic diode or a germanium crystal diode. The lower and higher resistances and the currents which produce them are called the forward and backward resistances and currents respectively.

According to the invention an electric pulse modulator comprises two rectifiers in series connection and the same polarity in the series connection and means arranged to supply current to the junction of the two rectifiers from a plurality of sources including an input pulse train source, the resultant current having one of the two possible polarities only in the presence of an impulse from the input pulse train source.

In one modification of a modulator according to the invention, the plurality of sources include at least two input pulse train sources, the resultant current from the plurality of sources, having one of the two possible polarities only in the presence of a predetermined combination of pulses from the input pulse train sources.

In a further modification in which the plurality of sources include at least two input pulse train sources, the resultant current from the plurality of sources has one of the two possible polarities only in the presence of impulses from each of the input pulse train sources.

In particular applications of the invention, the plurality of sources include also a signal source, and the resultant current from the plurality of sources has one of the two possible polarities only in the presence of a predetermined combination of impulses from the input pulse source or sources, and a pre-determined signal from the signal source.

Figure 1:
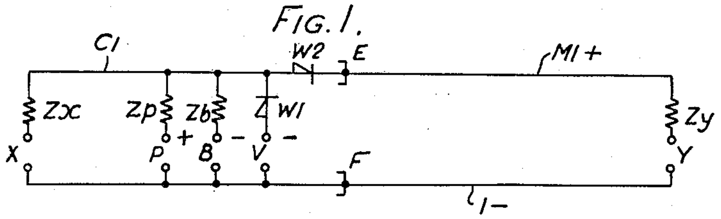
Figure 4:
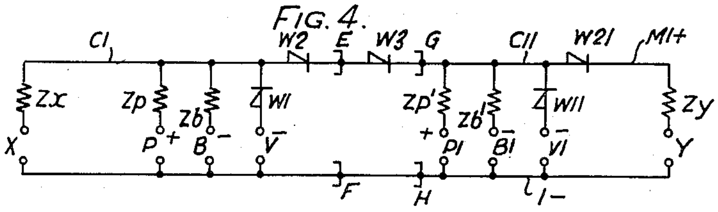
Figure 5:
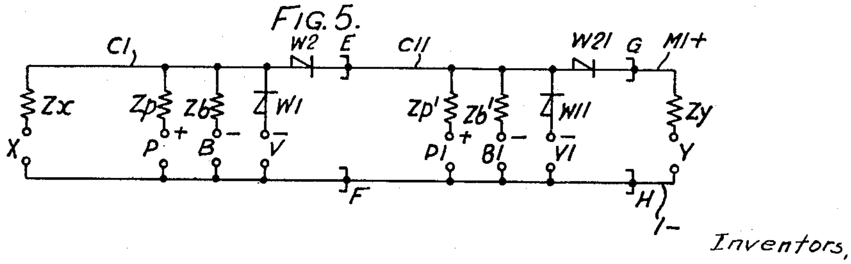
Figure 6:
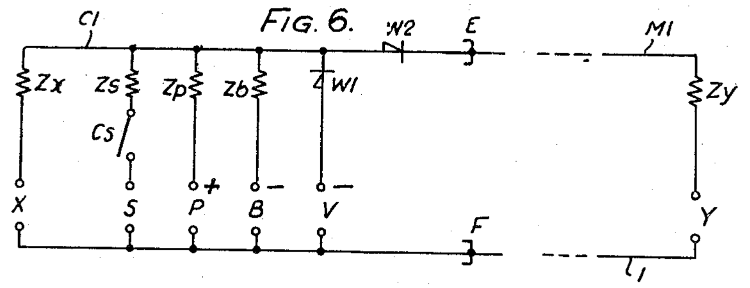
Figures 7, 8, 9:
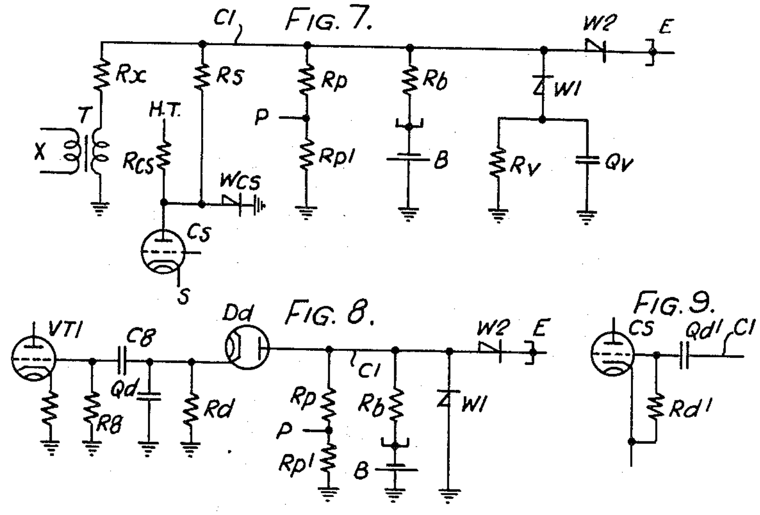
Figures 10, 11:
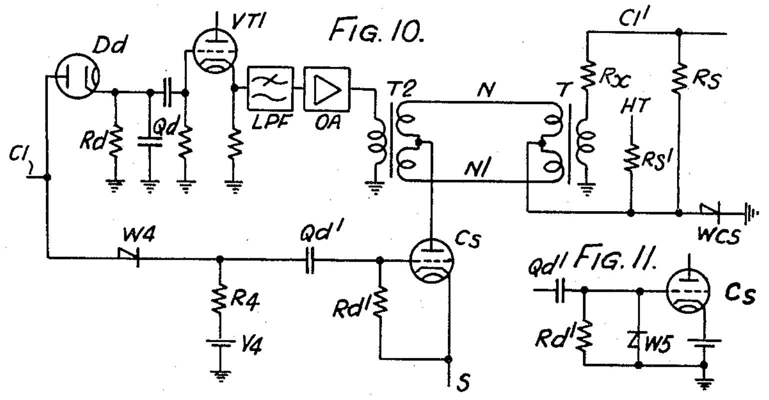

The invention will be better understood from the following description of particular applications which are given by way of example with reference to the accompanying drawings in which:

Fig. 1 shows a general form of the modulator according to the invention and comprising a shunt and a series arm, Figs. 2, 3, 4, 5 and 6 show alternative forms of modulator which provide greater flexibility in methods of operation than the arrangement shown in Fig. 1, Fig. 7 shows a particular form of transmit channel modulator according to Fig. 6, Fig. 8 shows a particular form of receiving channel modulator, Fig. 9 shows a detailed modification of Fig. 8, Fig. 10 shows an application of the invention to a telephone switch system and Fig. 11 shows a detailed modification of Fig. 10.

Referring to Fig. 1 of the drawings, the shunt arm comprises in parallel connection a rectifier W1 in series with a source of bias E. M. F. V, an impedance $Z_b$ in series with a source of bias E. M. F. B, and an impedance $Z_p$ in series with a source of pulse train E. M. F. P, the impedances $Z_p$ and $Z_b$ including the internal impedances of the sources of E. M. F. to which they are connected. The series arm comprises the rectifier W2. One side of the shunt arm is connected to a common lead 1, and the other to the series arm so that the two rectifiers are in series connection and the polarities of the two rectifiers are the same in the series connection. The polarities will be assumed to be such that the rectifiers offer low resistance to the flow of current in the direction from the shunt to the series arm and high resistance in the opposite direction. To the shunt arm is connected a channel indicated by leads C1 and 1 and termed the shunt channel, and terminated by an impedance $Z_x$ in series with a source X of E. M. F. The impedance $Z_x$ includes the internal impedance of the source X and if the channel is electrically long, the impedance $Z_x$ is the image impedance of the channel. To the free end of the series arm remote from the shunt arm is connected a channel indicated by leads M1 and 1 and termed the series channel and terminated by an impedance $Z_y$ in series with a source Y of E. M. F. The impedance $Z_y$ includes the internal impedance of the source Y and is the image impedance of the channel if the channel is electrically long. One terminal of each source of E. M. F. X, Y, is connected to the common lead 1. The E. M. F. of the source will be taken as positive if the E. M. F. of the other terminal is positive with respect to lead 1. With this convention and the previously stated polarities of the rectifiers W1 and W2, for the operation of the modulator as a pulse train modulator, the input pulse E. M. F. is positive and the bias E. M. F. B is negative.

In particular applications, the bias E. M. F. V may be zero that is, omitted, and the E. M. F. of one of the sources X and Y of E. M. F. may also be zero. The input pulse train and bias sources may also take forms which are physically different but electrically equivalent to that shown in Fig. 1, for example, the bias and pulse E. M. F. may be connected in series with one another and with a common impedance.

For the modulation to be linear, in the presence of an input pulse from the pulse train source there must be current flow in rectifier W2 but none in rectifier W1, and to prevent cross-talk between the channels of modulators connected in parallel, as later explained in more detail, in the absence of an input pulse there must be no current flow in rectifier W2. To satisfy these conditions, at least the following requirements must be fulfilled. First, the E. M. F. source Y must at all times be more positive than the E. M. F. of bias source V; second, in the absence of an input pulse the resultant current from all the sources connected to the shunt channel must be negative and third, in the presence of an input pulse the resultant current from all sources connected to the shunt channel must be positive. Let it be assumed that these conditions, which will be termed the primary conditions, are satisfied. Let it further be assumed that the E. M. F. of both sources X and Y is zero. Then, in the absence of an input pulse the voltage across the shunt channel is substantially the voltage of the bias source V, and that across the series channel is zero, and in the presence of an input pulse there is across the series channel a voltage due to the flow of the resultant current through impedance $Z_y$ and across the shunt channel a voltage due to the flow of the resultant current through rectifier W2 and impedance $Z_y$. Hence there is applied to both the shunt and series channels an unmodulated voltage pulse. Let it now be further assumed that source X is a source of E. M. F. which varies slowly relative to an input pulse train, that is, that it does not change substantially during the duration of a pulse of the train. Then the series channel will have applied to it a voltage pulse train which is modulated in amplitude by the source X, which is therefore termed a modulating source. Alternatively, let it now be further assumed that source Y is a source of E. M. F. which varies slowly relative to the input pulse train, then the shunt channel will have applied to it a voltage pulse train which is modulated by the modulating source Y.

Let it be assumed that source X or Y instead of being a source of slowly varying E. M. F. is a modulating source the E. M. F. of which varies rapidly relative to an input pulse train and in particular that it is a modulated pulse train having the same period as the input pulse train and having pulses which have a shorter duration than and are overlapped in time by the pulses of the input pulse train. The voltage across the channel other than the one to which the modulating source is connected, now comprises an unmodulated pulse train on the pulses of which are superimposed the pulses of a pulse train which is modulated in the same characteristic for example amplitude, width or position, as the modulating pulse train. In the case of a modulating pulse train which is amplitude modulated, the input pulses may be shorter in duration than the modulating pulses, but modulating pulse trains which are modulated in some other way require the input pulse trains to be longer as previously stated.

A first application of the pulse modulator is therefore to produce an amplitude modulated pulse train from a slowly varying modulating source. If amplitude modulated pulse transmission is desired, the pulses of the input pulse train are preferably of substantially rectangular waveform and the modulated pulse train can be transmitted directly. If the transmission of a pulse train modulated in characteristic other than amplitude is desired, a waveform of the input pulse train other than rectangular may be chosen and further apparatus provided to convert the amplitude modulated pulse train to the desired form of modulation. For example, a constant amplitude width-modulated pulse train may be produced by substantially triangularly-topped input pulse trains and a device to limit to a pre-determined value the voltage across the transmitting channel.

A second application of the modulator is based on the described property of communicating a modulated pulse train from one channel to the other channel connected to the modulator. The modulator may therefore be used to communicate a selected pulse train from a number of time spaced pulse trains on one channel to the other channel, a necessary condition for which is that the pulses of the input pulse train synchronise with the modulated pulses of the train which it is desired to select. The modulator may also be used as will be described later to communicate a selected number of pulse trains from a greater number of time spaced pulse trains on one channel to the other channel, a necessary condition for which is that the pulses of the input pulse trains synchronise with the pulses of all the modulated pulse trains which it is desired to select.

The primary conditions for linear modulation have already been stated, and can be exactly fulfilled in practical applications without difficulty. However in practical applications difficulties are encountered in maintaining linear modulation even when the primary conditions are satisfied and give rise to secondary conditions, which although these cannot be so exactly defined or satisfied as the primary conditions, can be satisfied sufficiently to produce modulation which is linear to an acceptable degree. One cause of non-linearity is the imperfections of the rectifiers which possess not only asymmetrical resistance but also finite and non-linear resistance in the two polarities to degrees dependent on the material and construction of the rectifiers. Finite, but linear, forward and backward resistances of the rectifiers would affect the amplitude of the modulation of the pulse train transmitted but would not introduce modulation amplitude distortion. Finite and non-linear forward and backward resistances modify the current flow in dependence on the currents flowing in the rectifiers and hence introduce modulation amplitude distortion. The distortion due to the series rectifier W2 may be reduced to an acceptable value by rendering, by any well-known means, the currents flowing to the junction of the two rectifiers, except through the rectifiers, substantially independent of the voltage at the junction of the rectifiers. If the resultant of these currents flows entirely in rectifier W2 in the presence of an input pulse, then if the modulating source is connected to the shunt channel, the series channel receives a current, and if impedance $Z_y$ is linear, which it usually is, the series channel also receives a voltage, which is, during the input pulses, independent of the rectifier W2, and if the modulating source is connected to the series channel, the shunt channel receives during the input pulses, a voltage which is the sum of the modulating voltage and the voltage drops along impedance $Z_y$ and rectifier W2 due to a constant current. There is therefore substantially no modulation amplitude distortion due to rectifier W2.

The production from the sources of E. M. F. connected to the shunt channel of currents which are independent of the current through the rectifier W2, is facilitated by arranging for the currents through the rectifier to range over the values for which the A. C. resistance of the rectifier approaches its minimum value. However, not all the current will flow through rectifier W2 during an input pulse because of the leak current through rectifier W1, causing modulation amplitude distortion which can be reduced to an acceptable value by using rectifiers with a high ratio of back to forward resistance, for example thermionic diodes or germanium crystal diodes, and arranging that rectifier W1 shall operate in the presence of an input pulse over a range of voltages for which its A. C. back resistance is a maximum.

Summarising the foregoing explanation, non-linearity of the modulation is a result of the non-linear forward and backward resistances of the rectifiers. The secondary conditions which reduce the non-linearity are first, the employment of rectifiers, which have a high ratio of back to forward resistance, second, rendering the currents flowing to the junction of the two rectifiers, except through the rectifiers, substantially independent of the voltage at the junction of the rectifiers and third, operating the shunt rectifier W1 in the presence of an input pulse over a range of voltages for which its A. C. back resistance has its highest values. These conditions may be satisfied in practice, for example, the first, by the employment of thermionic diodes or germanium crystal diodes, the second, by making impedances $Z_x$, $Z_p$ and $Z_b$ very much larger than the impedance $Z_y$ and the resultant current through them in the presence of an input pulse and hence through the series rectifier W2, of such value that the A. C. forward resistance of the rectifier approaches its lowest value. The third condition is often satisfied by the application of the other primary and secondary conditions, but if it is not, it can be satisfied by making the rectifier bias E. M. F. more negative than is minimally demanded by the primary conditions or the equivalent operation of adding a steady positive bias to source Y.

Further aspects of the modulator are concerned with cross-talk and require further secondary conditions which are described later.

A modulator embodying the present invention may have a shunt arm which contains a plurality of input pulse train sources. In one such application of the invention, the modulator produces an output pulse only when coincident pulses are generated by the input pulse train sources. For example, a modification of the modulator shown in Fig. 1 may be provided with an additional input pulse train source having one pole connected to the common lead 1 and the other connected to one end of an impedance the other end of which is connected to the junction of the two rectifiers W1 and W2. That impedance may include the internal impedance of the additional pulse train source. The input pulse train sources generate pulses of the same polarity. With the previously stated polarities of the rectifiers W1 and W2 and of the bias source B, the input pulse train sources are required to be sources of positive pulses. In order that the modulator shall produce an output pulse only in the presence of a pulse from both of the input pulse train sources simultaneously, it is necessary that the current entering the junction of the two rectifiers from all other sources except the two input pulse train sources, shall at all times be negative and exceed the positive current entering the junction of the two rectifiers from either of two input pulse train sources when their pulses are separately present, but be less than the sum of the currents entering the junction of the two rectifiers from the two pulse train sources when their pulses are simultaneously present. In a further application of the invention, the additional input pulse train source may comprise, not an input pulse train source, but a source of direct current signals which permits the modulator to produce an output, or prevents the modulator producing an output pulse train in dependence on the signal. A particular example of this is described later in connection with Fig. 6.

In a still further application of the invention, a modulator may have a shunt arm which contains a plurality of input pulse train sources and the modulator produces an output pulse when coincident pulses are generated by certain of the pulse train sources in the absence of pulses from the other pulse sources, but does not produce an output pulse in the presence of a pulse from any one of the other pulse train sources which are termed inhibiting sources. If the additional input pulse train source of the modification just described is a source of negative pulses and the current entering the junction of the two rectifiers from that source exceeds the current entering the junction of the two rectifiers from source P, no output pulse will be produced when coincident pulses are generated by the train pulse train sources but an output pulse will be produced when a pulse is generated only by pulse train source P.

Figure 2:
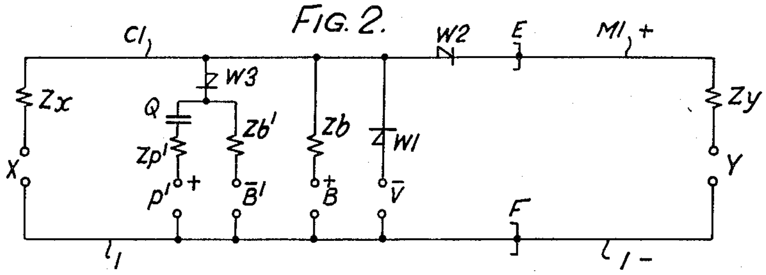

The modulator described with reference to Fig. 1 has a source B of negative bias potential with impedance $Z_b$. In particular applications of the invention, in order to utilise available power supplies none of which is individually suited to the modulator or for other reasons, a plurality of bias sources, some of which may provide positive E. M. F., may be used in combination with resistors in a circuit which is equivalent to the single bias source B shown in the figures. The impedance $Z_p$ and the source of pulse E. M. F., P, may be replaced by apparatus comprising rectifier W3, impedances $Z_b1$, capacitor Q, bias source B1 and source of pulse train E. M. F. P1 as shown in Fig. 2. Rectifier W3 is so connected to lead C1 that it offers a low resistance to current flowing through it from lead C1 and to the end of the rectifier remote from C1 are connected one plate of capacitor Q and one end of impedance $Z_b1$. The other plate of capacitor Q is connected through impedance $Z_p1$ to one pole of pulse train source P1 whose other pole is connected to the common lead 1. The other end of impedance $Z_b1$ is connected to one pole of the bias source of E. M. F. B1 the other pole of which is also connected to the common lead 1. The input pulse train E. M. F. is positive; the bias E. M. F. of source B is positive and the bias E. M. F. of source B1 is negative. The impedances $Z_b$ and $Z_b1$ and the E. M. F.'s of sources B and B1 are so chosen that in the absence of pulses from source P1, the current through impedance $Z_b$ is smaller than the current through impedance $Z_b1$ and W1 passes current in its conducting direction. Rectifier W2 will then be biased by the voltage difference between lead C1 and lead 1 to its non-conducting condition and no current will flow in the lead M1. The pulses from source P1 are of such an amplitude that they bias rectifier W3 to its non-conducting condition. When that happens current ceases to flow through rectifier W1 and the potential of lead C1 rises, rectifier W2 conducts and current flows in the lead M1.

In the absence of a modulating signal from source X, pulses are generated in load impedance $Z_y$ synchronized with those generated by pulse train source P1. If a modulating signal is present in modulating source X or source Y, the current pulses that flow in lead M1 or C1 at the times of occurrence of the pulses from pulse train source P will be affected by the instantaneous voltage of the modulating E. M. F., so producing in lead M1 or C1 a pulse train, amplitude modulated by the modulating signal at X or Y. This application of the invention has the advantage compared with the previously described applications that the input pulse may have a low impedance and a lower pulse voltage for a given non-linearity in the modulation process and the modulated pulses are unaffected by the amplitude of the pulses of the input pulse train provided that they exceed a pre-determined minimum.

If a second set of components corresponding respectively to the rectifier W3, impedance $Z_b1$ and $Z_p1$, capacitor Q, bias source B1 and pulse train source *p1* in Fig. 2, is connected between leads C1 and 1 and the same voltage and impedance requirements hold as have already been described as being necessary for the operation of the whole apparatus of Fig. 2, an impulse will appear on lead M1 only when the impulses from the pulse train source P1 and the corresponding pulse train source in the second set of components coincide and the pulses on lead M1 will be modulated by any modulating signals present in source X or source Y.

A plurality of modulators according to Fig. 1 may be connected to a common channel to form what will be termed a multiplex modulator, the individual modulators of which will be termed channel modulators. The common channel may be connected to the series channel of all the modulators in parallel, as shown by the common points E and F in Fig. 1, or the shunt channels of all the modulators in series. The second method of connection is of so much less value in practice than the first that the further description will be confined to the first method. The common channel will be termed the multiplex channel.

Referring again to Fig. 1, if the input pulse trains of the shunt channels of all the modulators are time-spaced so that no two pulses occur simultaneously, and if the E. M. F's of all the modulating sources are zero, each shunt channel will receive an unmodulated voltage pulse train due to its own input pulse train and the multiplex channel will receive time spaced pulse train due to all the input pulse trains. The input pulse train to a shunt channel will be termed the channel input pulse train, the rate at which the pulses of a channel pulse train occur will be termed the channel pulse repetition frequency and the period of the frequency the channel pulse period. A pulse train due to a channel input pulse train will be termed a channel pulse train, the individual pulses of which are the channel pulses. A plurality of channel pulse trains communicated over a multiplex channel will be collectively referred to as a multiplex pulse train the individual pulses of which are multiplex pulses and the time spacing between a channel pulse train and channel pulse train next in order will be termed the multiplex pulse period.

The practical applications of the multiplex modulator of Fig. 1 are two-fold, namely to modulate by slowly varying modulating sources connected to the shunt channels the channel pulse trains transmitted over the multiplex channel, and to select channel pulse trains received over the multiplex channel for communication individually or in groups to the shunt channels. The direction of transmission through the modulator is therefore fixed according to the use. Modulation of channel pulse trains by slowly varying E. M. F.'s applied to the shunt channels will be called transmission, the shunt channels being input channels and the multiplex channel, a multiplex transmitting channel. The selection of channel pulse train for communication over a shunt channel will be called reception, the shunt channels being output channels and the multiplex channel a multiplex receiving channel. In either use the channel modulators individually operate as previously described for Fig. 1 without mutual interference between them or their modulated pulses except due to imperfections in the rectifiers and unavoidable capacitances between the components and conductors of the modulator as will now be described.

The fact that in the absence of a channel input pulse the forward resistance of rectifier W1 of the channel modulator is not zero and the back resistance of rectifier W2 is not infinitely great, except possibly for thermionic diodes, means that there is a high attenuation coupling between the multiplex channel and each individual channel except for the low attenuation coupling of one channel at a time by the channel input pulses. Hence cross-talk occurs between all the channels. The cross-talk may be reduced to an acceptable value by the first of the secondary conditions already mentioned for the reduction of non-linearity, namely, the use of rectifiers with an inherently high ratio of back to forward resistance together with a fourth secondary condition that the rectifier W1, in the absence of a channel input pulse, is operated over a range of currents for which its A. C. forward resistance approaches its minimum value and a fifth condition that the rectifier W2, in the absence of a channel input pulse, is operated over a range of voltages for which its A. C. back resistance has its largest values. The fourth condition largely determines the bias current from source B. The fifth condition is largely concerned with the bias V or its equivalent bias at source Y and as these biases have also to satisfy the third secondary condition, some compromise may be necessary. However in practice, apart from the fact that if similar rectifiers are used for both W1 and W2 the optimum biases for each are very nearly the same, the linearity requirements are usually satisfied so long as the back-voltage applied to rectifier W1 in the presence of an input pulse exceeds a minimum value so that it is usually sufficient to choose the bias voltage to satisfy the cross-talk requirements.

If the bias source V has an internal impedance this will reduce the attenuation of the coupling between the channels and the multiplex channel and increase the cross-talk, and if a common bias source is used, as it may be, for all the channel modulators, its internal impedance will cause voltages due to the current in all the channel modulators and further cross-talk. It is of advantage that the bias source be shunted by a condenser of impedance low relative to the forward resistance of the rectifier W1 at the component frequencies of the modulating source. It may here be mentioned that the bias source may be conveniently provided for each modulator separately by a resistor in parallel with a condenser, the resistor of such value as will produce by the mean current through it the desired bias voltage and the condenser of value as already described.

The effect of capacitance in the modulator is also to cause cross-talk. Capacitance between the electrodes of the series rectifiers W2 constitutes an impedance in parallel with the back resistance of each rectifier in the absence of a channel input pulse train and therefore an additional source of coupling between the multiplex channel and the modulator shunt channels. The capacitance which is presented as a shunt across the multiplex channel causes wave-form distortion and therefore cross-talk between the channel pulse trains according to well established theory. Wave-form distortion may also be a feature of the multiplex channel if it is electrically long. Cross-talk due to wave-form distortion may be minimised by a suitable choice of channel pulse duration. Durations which are 0.1 to 0.2 of the multiplex pulse period are satisfactory.

Figure 3:
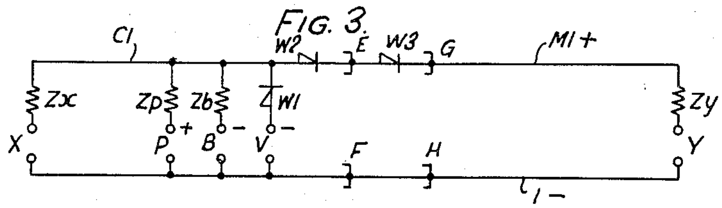

The use of rectifiers having low electrode capacitances, for example the thermionic diodes and germanium crystal diodes previously mentioned, is a further step toward rendering the effects of capacitance negligible. Nevertheless, when the number of modulators paralleled together is large, for example one hundred, the effects of the capacitance presented in shunt with the multiplex channel may be serious. This difficulty is surmounted according to another feature of the invention by paralleling the modulators in groups which are each connected through a further rectifier to the multiplex channel as shown in Fig. 3. For example, and referring to Fig. 3, for a one-hundred channel multiplex, the channel modulators, each with a rectifier W1 and W2, may be commoned in groups of ten modulators, each to a common point E, which is then connected via a rectifier W3 to the multiplex channel. The shunt capacitance presented to the multiplex channel is then reduced by a factor of substantially ten or five in the absence or presence respectively, of a channel input pulse with substantially no effect on the linearity of the modulation provided that the currents flowing are rendered substantially independent of the currents through the rectifiers as already described. The additional rectifiers attenuate the modulation of the channel pulse trains of a transmitting multiplex modulator, which attenuation can, without difficulty, usually be made up by amplifiers in other parts of the system, but have substantially no effect on the modulation amplitude or pulse waveform of receiving multiplex modulators. The additional rectifiers also reduce the cross-talk between the channels.

The channel input pulse trains of channel modulators connected to a common channel have to be time-spaced so that the pulses of no two pulse trains occur simultaneously. The channel input pulse train of a receiving modulator must be synchronised with a channel pulse train received over the multiplex receiving channel from a transmitting modulator. When the number of channels in the multiplex is large, for example one hundred, difficulties may arise in practice in achieving the accuracy of the time-spacing of the input and output channel pulse trains necessary to the synchronisation of the receiving multiplex and channel pulse trains. The durations of the channel input pulses and therefore of the multiplex pulses may be increased so that the receiving multiplex and channel pulses coincide, if not exactly, at least over a portion of the pulses, but increased pulse durations tend to increase the cross-talk between the channels.

According to another feature of the invention a common modulator interposed between the common channel of a multiplex modulator and the multiplex channel may be used in conjunction with increased duration channel pulses to improve the synchronisation without substantial increase in cross-talk between the channels or in modulation distortion.

Referring to Fig. 4, the common modulator is shown as comprising rectifiers W11 and W21, a source of bias E. M. F. V1 in series with rectifier W11 and the common lead 1, a lead M1 in series with rectifier W21, the leads M1 and 1 comprising a multiplex channel terminated in an impedance $Z_y$ and source of E. M. F. Y in series, a lead C11 connected to the junction of the two rectifiers and comprising with lead 1 the shunt channel, and both a source of bias E. M. F. B1 in series with an impedance $Z_b1$ and a source of input pulse train E. M. F.

P1 in series with an impedance $Z_p1$ connected to the shunt channel. To the shunt chanel is also connected the common channel of a multiplex modulator according to Fig. 3, the duration of the input pulses of which are increased beyond the desired duration of the multiplex pulses by an amount at least equal to the sum of the maximum positive and negative inaccuracies in their spacing. The input pulse train source P1 comprises pulses of period equal to the multiplex pulse period, of duration equal to the desired duration of the multiplex channel pulses and of timing such that a common modulator input pulse occurs wholly within the increased duration of a channel input pulse. The components of the common modulator can be arranged to satisfy the previously described primary and secondary conditions for linear modulation.

In operation, a multiplex modulator channel, input or output according to the direction of transmission, is in communication with the multiplex channel only for the duration of a common modulator channel input pulse. The timing of the channel trains is thus dependent on the single common modulator input pulse train which may be generated more accurately than a large number of separate trains. The channel pulses of the multiplex modulator have greater duration than the multiplex pulses but this does not result in increased cross-talk between the channels because the multiplex modulator channel pulses are presented to the shunt channel of the common modulator which has negligible reactive admittance and low resistance except during the pulses of the input pulse train to the common modulator. The linearity of the modulation is affected only by the additional non-linear shunt provided by the rectifier W11 but this in practice with available rectifiers can be made negligibly small.

A feature of the invention that modulators may be operated in tandem, of which Fig. 4 is an example, and which is advantageous in particular applications, is illustrated by the further example shown in Fig. 5. Referring to that figure, lead 1 is a lead common to all modulators and channels. Bias source V and rectifiers W1 and W2, shunt channel C1, input pulse train source P and impedance $Z_p$, and bias source B and impedance $Z_b$ represent a channel modulator according to Fig. 1. A plurality of similar channel modulators are commoned at points E and F to form a group which is connected to the shunt channel C11 of a modulator which will be termed a group modulator and which comprises bias source V1, rectifiers W11 and W21, input pulse train source P1 in series with impedance $Z_p1$ and bias source B1 in series with impedance $Z_b1$ and both connected to the shunt channel. A plurality of similar group modulators each similarly connected to a group of channel modulators are commoned at points G and H to form a super-group which is connected as shown to a multiplex channel, although further stages of modulation may be desirable in particular applications. Each modulator may be arranged to satisfy the previously described conditions for linear modulation. The channel input pulses trains have the desired channel pulse repetition frequency. The input pulse trains of channels commoned together are time-spaced and preferably uniformly time-spaced so that the pulses of no two pulse trains are coincident. Because the channels of a group are so much less in number than the channels of a multiplex channel, and also because the shunt channels of group modulators have low reactive admittance and low resistance, the channel input pulses may have and desirably will have, a much greater duration than the multiplex pulses. Each group modulator input pulse train has a pulse repetition frequency such that a pulse occurs for every pulse of every channel input pulse train connected to the channel modulators in the group connected to the group modulator. The input pulse trains of a group of channels are timed so that a group modulator input pulse occurs within the duration of every input pulse of every channel. The group modulator input pulses have a pulse duration equal to the multiplex pulse duration, and the input pulse trains of the group modulators connected to the multiplex are time-spaced and preferably uniformly time-spaced so that the pulses of no two pulse trains are coincident. The commoning and connecting in tandem of modulators as described has advantages in particular applications where the number of channels in the multiplex is large. For example, 100-channel multiplex modulators may be arranged as ten groups each of ten commoned channel modulators and each in series with one of ten group modulators commoned in a super-group. The connection has similar advantages as that of Fig. 3 as regards the reduction of the capacitance presented to the multiplex channel by the modulator, and as regards the reduction of cross-talk and the similar advantage as that of Fig. 4 in the accuracy with which the multiplex channel pulse trains may be timed. It has the further advantage that the number of input pulse train sources may be much less than the number of channels. Because pulses of the channel input pulse trains can have a much greater duration than the pulses of the group modulator input pulse trains, sets of channel input pulse trains may be common to more than one group of channels and the group modulator input pulses still fall within the durations of the channel input pulse. For example, in a 100-channel system having a pulse repetition frequency of 10 kc./s., and comprising channel modulators in groups of 10, a set of ten channel input pulse trains each comprising pulses 8 microseconds long may be common to five groups of channel modulators, and a second set similar, except for being timed 5 microseconds later, may be common to the remaining five groups of channels, the group modulator input pulse trains having pulse durations of 0.2 microsecond, will satisfy all the pulse conditions with only 30 sources of input pulse trains.

Description has been given of the application of the invention, and the conditions necessary to modulators which modulate substantially linearly and with a minimum of cross-talk between the channels. In particular applications of the invention modification of either or both the linearity and cross-talk characteristics may be permissible or desirable and examples of such modification will now be described.

One modification of the modulator finds application in transmitting modulators used in exchange switching systems, for example the system described in the specification of co-pending patent application Ser. No. 56,619 date of filing October 26, 1948 in which, in dependence on a switching operation, a multiplex channel pulse train is either linearly modulated by speech on the channel or suppressed, the channel being termed respectively switched on or off in the two conditions. Fig. 6 shows an example of a modulator arranged according to this requirement.

Fig. 6 shows the general form of the modulator as shown in Fig. 1 except that part of the lead M1 is shown in broken line to indicate that further rectifiers and modulators in tandem may be provided, as already described with reference to Figs. 3, 4 and 5, and with the addition to the shunt arm of the channel modulators of a circuit comprising in series a source of bias S, an impedance $Z_s$ and a switching device indicated by a relay make contact $C_s$, although in practice other switching devices, for example thermionic valves may be employed. When the contact $C_s$ is open, no current flows due to source S and the modulator operates as a linear modulator, but when current flows due to contact $C_s$ being closed, a bias current flows and reinforces the bias current from source B so that the resultant current from all sources of current connected to the shunt channel is always negative, and hence no channel pulse train is produced. Alternatively, the current from bias source B may be increased and the polarity of source S reversed so that when contact $C_s$ is open, no current flows due to source S and the resultant current from all sources of current connected to the shunt channel is always negative and hence no channel pulse train is produced, but when contact $C_s$ is closed a bias current flows from source S which opposes the bias current from source B so that the modulator operates as a linear modulator. In a particular example, the contact $C_s$ may take the form of a rectifier which is switched by the signal current in the same way as in the description with reference to Fig. 2, the rectifier W3 is switched by the pulse P1. A transmitting group modulator in tandem with a group of channel modulators according to Fig. 6 is required to produce a channel pulse train corresponding to a channel modulator only if the channel modulator is switched on. This requirement may be satisfied by an addition to the third primary condition already stated when applied to group modulators. The primary condition in question is that in the presence of an input pulse the resultant current from all sources connected to the shunt channel of a modulator shall be positive. This condition imposes a minimum value on the input pulse current but not a maximum value. The modulating source of a transmitting group modulator is a group of modulators each of which produces no modulating current to the group modulator when switched off, but when switched on, produces current pulses which have minimum and maximum values disposed about a mean according to the desired depth of modulation. A group modulator input pulse occurs only during a channel pulse of any channel modulator which is modulating linearly. Hence the primary condition quoted when applied to a group modulator means that in the presence of an input pulse, the resultant current from all sources connected to the shunt channel including a modulating source having a minimum positive value, shall be positive. If the primary condition for a transmitting group modulator, the channels of which can be switched on and off, is stated to be that in the presence of an input pulse the resultant current from all sources connected to the shunt channel shall be positive for all positive values of modulating current pulses and negative for zero modulating current, then a channel may be switched on and off through tandem modulators, the only effect of the modified condition being to impose a maximum as well as a minimum value on the group modulator input pulse current.

The corresponding condition of receiving multiplex modulators through which the switched on and off condition of a multiplex pulse has to be detected will now be discussed. It has already been described in connection with Fig. 1 that if the E. M. F. of both sources of X and Y of that figure are zero, an unmodulated pulse train appears in the shunt channel and series channel which are the output and multiplex channels respectively of a receiving multiplex modulator and this is the condition which applies to the output and the multiplex channel of a receiving multiplex modulator when the corresponding multiplex pulse train is switched off. When the multiplex pulse train is switched on, a modulated pulse train is superimposed on the unmodulated pulse trains. Detection whether a multiplex pulse train is switched off or on therefore requires apparatus to distinguish the unmodulated output channel pulse trains from the output channel pulse trains on which is superimposed the modulated pulse trains. This is most readily accomplished by some form of voltage measuring device. Detection is facilitated by arranging that the ratio of the maximum voltages of the modulated and unmodulated pulse trains is as large as it can conveniently be made. This resolves itself into making the modulated pulse train E. M. F. the E. M. F. Y of the figures, as large as convenient for example by amplification, and the pulse amplitude of the unmodulated pulse train small by making the internal impedance $Z_y$ of the multiplex channel as small as convenient and employing no more current in the several modulator imput pulses then will adequately satisfy the secondary conditions for linear modulation. The last mentioned point is facilitated by applying to receiving group modulators the same modification to the primary condition which was described for transmitting group modulators.

Fig. 7 shows a preferred form of transmitting channel modulator according to Fig. 6. The rectifiers W1 and W2 are germanium crystal diodes. Comparing Figures 6 and 7, the common lead 1 in Fig. 6 is earth in Fig. 7 the modulating source X is a communication channel X terminated on the primary winding of a transformer T, the secondary winding of which is connected one side to earth and the other side to a resistor $R_x$ which is the impedance $Z_x$ of Fig. 6. The transformer turns ratio matches the impedance of the modulating source to that of the modulator. Impedance $Z_p$ of Fig. 6 is resistor $R_p$ in Fig. 7, source P is a resistor $R_{p1}$ of low resistance in comparison with resistor $R_p$, the junction of the two resistors being connected via lead P to a pulse train generator for example a thermionic valve pulse train generator which generates positive going pulses. Bias source B in Fig. 6 is in Fig. 7 a battery B with its positive pole earthed and its negative pole common to all channel modulators, and impedance $Z_b$ is $R_b$. Bias source V in Fig. 6 is in Fig. 7 a resistor $R_v$ shunted by a condenser $Q_v$, the resistor being of such value that the average current through it produces the desired bias voltage and the condenser $Q_v$ having at all the component frequencies of the modulating source an impedance which is low relative to the resistance of the resistor $R_v$.

In particular applications it is possible, for example by the provision of a positive bias in the multiplex channel to arrange that the bias required in series with rectifier W1 is zero: the resistor $R_v$ may then be reduced to zero and the condenser $Q_v$ omitted. The impedance $Z_s$ of Fig. 6 becomes a resistor $R_s$ in Fig. 7; the bias source S, a source of voltage negative with respect to earth and the switching device $C_s$ a valve $C_s$ with its cathode connected to source S, its anode connected to resistor $R_s$ and also via resistor $R_{cs}$ to a source of voltage HT positive with respect to earth, and via rectifier $W_{cs}$ to earth. The valve is controlled on its control grid to be either conducting or non-conducting between its anode and cathode. When non-conducting, the anode potential of the valve is clamped by rectifier $W_{cs}$ to earth potential, which is equivalent to the contact $C_s$ of Fig. 6 being open. When the valve is conducting part of its anode current flows through resistor $R_8$ and biases the modulator so that no channel pulse train is produced, this being the equivalent of contact $C_s$ of Fig. 6 being closed.

In practice the lead between the anode of valve $C_s$ and the resistor $R_s$ may be taken in exchange cabling and subject not only to capacitance which might render the change of potential of the anode relatively slow when the grid potential was changed, but also to cross-talk from other similarly connected circuits. A condenser in the place of rectifier $W_{cs}$ would reduce the cross-talk but also increase the time taken to switch the channel on and off. The resistor $R_{cs}$ connected to a positive source of voltage HT together with the clamping rectifier $W_{cs}$ enable the desired change of anode potential of valve $C_s$ to take place quickly and also provide a low impedance path to earth for the cross-talk currents when the channel modulator is switched on.

The application to the transmitting modulator of the second and third and the additional primary conditions for linear modulation, requires a knowledge of the maximum and minimum values of the modulating current. If the modulating currents are, for example, speech currents, their minimum and maximum values may be indeterminate. Limiters of any well-known type are then desirably included in the speech path to pre-determine the minimum and maximum modulating currents.

Turning now to the cross-talk characteristics of the modulator, application of the primary and secondary conditions previously stated, provides a minimum of cross-talk between the channels. In more detail, in a complete transmission system comprising, in order, input channels, transmitting multiplex modulator, multiplex channels, receiving multiplex modulators and output channels, application of the primary and secondary conditions provides a minimum of cross-talk to any input channel from all the input channels, to any output channel from all other output channels, and to any output channel from all except its own corresponding input channel. In some applications cross-talk between the input channels of a transmitting multiplex modulator may be unimportant, for example if the modulating sources connected to the input channels comprise the output circuits of thermionic amplifiers.

Referring again to Fig. 1, this form of cross-talk is prevented by the first primary condition previously stated, viz., that the E. M. F. Y of the multiplez channel shall always be more positive than the bias sources V. Let it be assumed that this condition be not satisfied in a transmitting multiplex modulator but that the second and third primary conditions are satisfied and further that in the presence of an input pulse in any channel, the resultant current from the sources connected to the shunt channel, this current being positive from the application of the third primary condition, flowing into the impedance of the multiplex, i. e. series, channel makes the voltage of the channel positive with respect to the bias source V, then in the presence of an input pulse the linearity and cross-talk are the same as if the first primary condition had been satisfied. The difference exists that in the intervals between the presence of an input pulse in one channel and the presence of an input pulse in the channel next in order, each input channel is in communication with the multiplex channel over a high attenuation path comprising its two rectifiers W1 and W2 each biased to its low resistance by forward current, but currents communicated during these intervals may be rendered ineffective, for example either in the multiplex transmission or at the output channel by an apparatus which suppresses or is unresponsive to all voltage below a value not exceeded by the voltage due to the currents in question. During these intervals each input source X is also connected to every other source over a high attenuation path, but the resultant near-end cross-talk may, as already mentioned, be unimportant. If the impedance $Z_x$ and the source X pass a much narrower band of frequencies than the series channel $Z_y$, the near-end cross-talk voltage will be demodulated and so form a spurious audio-frequency signal which, after transmission, will give rise to distant-end cross talk.

Similarly, let it be assumed that in a receiving modulator the second and third primary conditions are satisfied but not the first, and further that in the simultaneous presence of an input impulse in any output channel and a multiplex pulse in the multiplex channel, the voltage of the multiplex channel is positive with respect to the bias source V, then in the presence of an input pulse in any channel the linearity and cross-talk are the same as if the first primary condition had been satisfied. The difference exists as in the case of a transmitting channel, that in the intervals between the presence of an input pulse in one channel and the presence of an input pulse in the channel next in order, each output channel is in communication over a high attenuation path with the multiplex channel and with every other output channel over two high attenuation paths in series. Again currents which are communicated to the channels during these intervals may be rendered ineffective, for example by an apparatus connected to each output channel and adapted to suppress all voltages below a value not exceeded by the voltages due to the currents in question. An example of such apparatus is shown in Fig. 8.

According to any of the Figs. 1 to 5, Fig. 8 shows a receiving channel modulator, the modulator receiving an amplitude modulated pulse train and being connected to demodulating apparatus, only part of which is shown in the figure, the demodulating apparatus having the feature that when a voltage pulse train is applied to it, it is unresponsive to voltages less than a predetermined fraction of the input pulse voltage. Referring to Fig. 8 the rectifiers W1 and W2 may be germanium crystal diodes. Comparing any of the Figs. 1 to 5 with Figure 8, the common lead 1 is earth, the E. M. F. of the bias source V is shown as zero as may be arranged and is referred to again later. The impedance $Z_p$ of Figs. 1 to 5 is resistor $R_p$ in Fig. 8, source P is a resistor $R_p1$ of low resistance in comparison with resistor $R_p$, the junction of the two resistors being connected via lead P to a pulse train generator, for example a thermionic valve pulse train generator, which generates positive going pulses. Bias source B in Figs. 1 to 5, is, in Fig. 8 a battery with its positive pole earthed and its negative pole common to all channel modulators, and impedance $Z_b$ is a resistor $R_b$. The shunt channel termination $Z_x$ of Figs. 1 to 5 is replaced by the diode detector circuit comprising the diode $D_d$ and the resistor $R_d$ connected in series between the lead C1, and earth. The resistor $R_d$ is shunted by the bypass condenser $Q_d$. The valve VT1 is a buffer-amplifier inserted between the detector circuit and the demodulating low-pass filter. The grid of valve VT1 is coupled to the detector circuit through a condenser C8 and connected through a leak resistance R8 to earth. The detector circuit is primarily needed because it restores in simple and economical manner, much of the voltage loss due to multiplexing. For example, if the channel pulses have a duration of 0.2/micro-second and a repetition frequency of 10 kc./s, the voltage received is 1/500 of the voltage which would be received if the modulators were turned on permanently; this results in a loss of 54 db. Most of this loss can be restored by the diode detector circuit shown in Fig. 8. The condenser $Q_d$ is charged to the peak voltage of each received pulse, the voltage leaking away during the periods between pulses. The circuit causes attenuation distortion in the modulated output at the higher modulating frequencies; the larger the time constant $R_d$ $Q_d$ the greater the attenuation distortion, but the greater the gain of the circuit. The time constant can be chosen so that with only a small amount of attenuation distortion the charge on condenser $Q_d$ does not leak away to zero between input pulses, and the detector then has the property of not responding to input voltages smaller than an amount which is pre-determined substantially by the amplitude and depth of modulation of the received pulse trains, and the time constant of the condenser $Q_d$ and resistor $R_d$. The demodulator is thus isolated, by the diode $D_d$, from low-level cross-talk in the modulator output channel. Satisfactory operation may therefore be obtained with equal bias to voltages in series with rectifier W1 or in the multiplex channel, or even with a bias voltage in the multiplex channel which is negative with respect to the bias voltage in series with rectifier W1. Use may be made of this feature when the switched on or off condition of the channel pulse train has to be detected in order to render the unmodulated received pulse train previously described very small. An alternative form of detector is preferred for detecting the switched on or off condition of the channel pulse train and will now be described with reference to Fig. 9.

The grid current detector shown in Fig. 9 performs the functions of the diode $D_d$ and the amplifier VT1 of Fig. 8 by means of the single valve $C_s$, the control grid and cathode of $C_s$ acting as the diode $D_d$. For linear detection the condenser $Q_d$ or $Q_d1$ of either circuit must be charged to substantially the peak voltage of the received pulse; the time constant of its charging circuit must therefore be much less than the duration of the pulse. Since the forward resistance of the rectifier formed by the control grid and cathode of a triode or pentode valve is usually much larger than the resistance between the anode and cathode of a diode, the condenser $Q_d1$ is usually much smaller than $Q_d$, and resistor $R_{d1}$ much larger than $R_d$, and the circuit of Fig. 9 may in consequence be difficult to design as a linear detector. In the telephone switching system referred to, it is advantageous to connect to a receiving channel modulator two detectors, one to operate linearly in the speech demodulating apparatus and one to operate non-linearly to detect the switched on or off conditions of the channel pulse train, and for this latter purpose the detector of Fig. 9 is preferred. The arrangements are shown in more detail in the example illustrated in Fig. 10.

Referring to Fig. 10, a lead C1 represents the output channel of a receiving channel modulator, for example according to Fig. 8, the output from which comprises an unmodulated positive pulse train having a maximum voltage V4, this pulse train occurring whether the channel is switched on or off, and a super-imposed modulated pulse train when the channel is switched on. The lead C1 is connected to a detector circuit comprising diode $D_d$, condenser $Q_d$, resistor $R_d$ and valve VT1 all similar to the like designated parts of Fig. 8, and to a rectifier W4 in series with a detector circuit comprising condenser $Q_{d1}$, resistor $R_{d1}$, and valve $C_s$ all similar to the like designated parts of Fig. 9, the junction between rectifier W4 and condenser $Q_{d1}$ being connected via a resistor R4 and positive bias voltage equal to V4 to earth. The output from valve VT1 is demodulated by a low pass filter LPF and fed by an output amplifier OA and output transformer T2 through the wires N N1 to transformer T to form the modulation input to a transmitting modulator similar to that shown in Fig. 7. In the absence of a channel pulse train of voltage on C1, the control grid of valve $C_s$ is at the same potential as its cathode which is connected to the negative bias source S. The anode current of valve $C_s$ is fed to the centre tap of the secondary winding of transformer T2 and flows along N and N1, in parallel, to transformer T, the centre tap of which is connected to resistor $R_s$ thus supplying an additional bias cuurrent to the transmitting modulator and preventing it from operating, as described in connection with Figs. 6 and 7. The purpose of the rectifier W4 and resistor R4 is to ensure that valve $C_s$ is biased to cut off only when the modulator receives its channel input pulse train and its channel pulse train from its series channel. When the channel pulse train is switched off, the potential of lead C1 is never more positive than voltage V4 but when switched on, the potential of lead C1 is more positive than voltage V4 during a channel pulse. The rectifier W4 therefore has the action that a pulse train is communicated to the grid of valve $C_s$ only when the receiving channel pulse train is switched on. During a pulse of the pulse train impressed on the grid of valve $C_s$, the condenser $Q_{d1}$ is charged through the grid-cathode conductance of the valve, the grid being positive with respect to the cathode. Between pulses the grid takes a potential which is negative with respect to the cathode and dependent on the potential difference between the plates of the condenser $Q_{d1}$ and the ratio of the resistances of resistors $R_{d1}$ and R4. The components of the circuit are selected so that the negative voltage is sufficient to cut off the anode current of valve $C_s$ between pulses. Hence, anode current flows only during the pulse and the pulse duration being only a small fraction of the pulse train period, the average anode current is substantially zero, thus removing the additional bias current from the transmitting modulator, the channel pulse of which is thus switched on. The fact that the condenser $Q_{d1}$ may not be fully charged to the potential of each channel pulse is of no consequence, since linear detection is not required.

It will be appreciated that the polarities of the rectifiers, currents and voltages stated in the previous description result from the assumed polarities of the modulator rectifiers W1 and W2. It will also be appreciated that if the opposite polarities of the modulator rectifiers W1 and W2 are assumed, the description applies with suitably reversed polarities of the rectifiers, currents and voltages, the only difficulties being concerned with the switching valve $C_s$ the operation of which in reversed polarity is not immediately apparent. In one such arrangement, the anode current of the valve $C_s$ is normally cut-off and caused to flow by negative going pulse trains from an output channel. Fig. 11 illustrates an apparatus which satisfies these conditions.

Referring to Fig. 11, the valve $C_s$ has its cathode at a positive potential with respect to earth, and its grid connected through a resistor $R_{d1}$ and rectifier W5 in parallel to earth. The valve is therefore normally cut-off. Negative-going pulses in the outgoing channel lead C1 are applied via condenser $Q_{d1}$ to the grid of valve $C_s$. Each pulse charges the condenser plate joined to the grid positively, so that in the intervals between the pulses, the grid of the valve is substantially at cathode potential and the valve $C_s$ conducts. This necessitates a change to the value of the bias resistor, for example $R_b$ in Fig. 7. The current through this resistor must be sufficient by itself to switch the channel off, but when opposed by the current through resistor $R_s$, to switch the channel on.

We claim:

1. An electric pulse modulator comprising first and second rectifiers in series connection and the same polarity in the series connection, a common lead, a shunt channel bridged across the junction of the two rectifiers and the common lead, an input pulse train source and a first bias source each in series with an impedance and bridged across the junction of the two rectifiers and the common lead, a further bias source having one side connected to the common lead and the other side connected to the end of the first rectifier remote from the second rectifier, and a series channel bridged across the end of the second rectifier remote from the first rectifier and the common-channel, the E. M. F.'s in the series channel and the further bias source when taken in the circuit including the two rectifiers in series being such at all times as to urge backward current through the rectifiers, and in which the resultant current from the shunt channel, the first bias source and the input pulse train source has the polarity of forward current flow through the second rectifier only in the presence of a pulse from the input pulse train source.

2. A modulator according to claim 1 in which the input pulse train source in series with an impedance is replaced by a rectifier in series with a parallel connection of an impedance in series with a third bias source and a condenser in series with a source of pulse train E. M. F., the rectifier having the same polarity as the said first rectifier when taken in a circuit including both rectifiers, the third bias source, when taken in the circuit which includes both rectifiers urging current through the rectifiers in their forward direction of conduction, and the pulses from the source of pulse train E. M. F., providing through the series condenser a current which exceeds the current provided by the said third bias source, to the circuit including both rectifiers.

3. A modulator according to claim 1 wherein the shunt channel of the modulator contains a source of modulating E. M. F.

4. A modulator according to claim 1 in which the series channel of the modulator contains a source of modulating E. M. F. and in which the series channel of the modulator contains a pulse train source.

5. A modulator according to claim 1 in which the shunt channel of the modulator contains a source of modulating E. M. F. and in which a source of signalling current is bridged across the junction of the first and second rectifiers and the common lead of the modulator, the source of signalling current providing one of two values of current in dependence on the signal being transmitted, the resultant current from the plurality of sources connected to the junction of the first and second rectifiers having the polarity of forward current flow through the first rectifier in the presence of one value of signalling current and the polarity of forward current flow through the second rectifier only in the presence of the other value of signalling current and a pulse from the input pulse train source.

6. A modulator according to claim 1 in which the shunt channel of the modulator contains a source of modulating E. M. F. and in which a source of signalling current is bridged across the junction of the first and second rectifiers and the common lead of the modulator, the source of signalling current providing one of two values of current in dependence on the signal being transmitted, the resultant current from the plurality of sources connected to the junction of the first and second rectifiers having the polarity of forward current flow through the first rectifier in the presence of one value of signalling current and the polarity of forward current flow through the second rectifier only in the presence of the other value of signalling current and a pulse from the input pulse train source said source of signalling current comprising the anode circuit of an electronic valve having at least an anode and a cathode and controlled so that the anode current flow is one of two values in dependence upon the signal to be transmitted.

7. A modulator according to claim 1 in which the shunt channel of the modulator contains a source of modulating E. M. F. and in which a source of signalling current is bridged across the junction of the first and second rectifiers and the common lead of the modulator, the source of signalling current providing one of two values of current in dependence on the signal being transmitted, the resultant current from the plurality of sources connected to the junction of the first and second rectifiers having the polarity of forward current flow through the first rectifier in the presence of one value of signalling current and the polarity of forward current flow through the second rectifier only in the presence of the other value of signalling current and a pulse from the input pulse source said source of signalling current comprising the anode circuit of an electronic valve having at least an anode and a cathode and controlled so that the anode current flow is one of two values in dependence upon the signal to be transmitted, the potential of said anode when one of the two values of current is flowing being clamped to a fixed potential by a clamp circuit comprising a rectifier.

8. A modulator according to claim 1 wherein the shunt channel of the modulator receives a pulse selected from a modulating pulse train applied to the series channel when a pulse synchronous with the selected pulse is applied to the input pulse train source.

9. A modulator according to claim 1 wherein the shunt channel of the modulator receives a pulse train selected from the modulating pulse train by the input pulse train applied to the modulator and wherein in operation the mean amplitude of the received pulse is one of two values in dependence on a signal transmitted to the shunt channel.

10. A modulator according to claim 8 in which the received pulse is demodulated by a low pass filter, the received pulse being communicated to a signalling device which responds to the mean amplitude of the received pulse.

11. An electric pulse modulator comprising first and second rectifiers in series connection and the same polarity in the series connection, a common lead, a shunt channel bridged across the junction of the two rectifiers and the common lead, an input pulse train source, a modulated pulse train source and a first bias source each in series with an impedance and bridged across the junction of the two rectifiers and the common lead, a further bias source having one side connected to the common lead and the other side connected to the end of the first rectifier remote from the second rectifier and a series channel bridged across the end of the second rectifier remote from the first rectifier and the common channel, the E. M. F.'s in the series channel and the further bias source when taken in a circuit including the two rectifiers in series being such at all times as to urge backward current through the rectifiers, and in which the resultant current from the shunt channel, the first bias source and the input and modulated pulse train sources has the polarity of forward current flow through the second rectifier only in the presence of coincident pulses from the input and modulated pulse train sources.

12. A multiplex electric pulse modulator comprising a number of groups of modulators, the modulators in each group being in parallel connection with one another and each modulator comprising first and second rectifiers in series connection and the same polarity in the series connection, a common lead, a shunt channel bridged across the junction of the two rectifiers and the common lead, an input pulse train source and a first bias source each in series with an impedance and bridged across the junction of the two rectifiers and the common lead, a further bias source having one side connected to the common lead and the other side connected to the end of the first rectifier remote from the second rectifier, third rectifiers connected in series with the paralleled second rectifiers and the same polarity in the series connection, the groups of modulators being connected in parallel with a common multiplex channel bridged across the third rectifiers and the common channels, the bias sources in each modulator being arranged so that normally the first and second rectifiers are rendered conducting and non-conducting respectively except in the presence of the pulse from the input pulse train source when the electrical conductivity of the first and second rectifiers is reversed and a pulse is applied to the common multiplex channel, the pulses of the input pulse sources of the modulators being so time spaced that none of the pulses of one source is coincident with the pulses of any other source.

13. A modulator according to claim 1 wherein the shunt channel of the modulator receives a pulse train selected from a modulating pulse train by an input pulse train connected to the modulator, the received pulse being demodulated by a low pass filter, the received pulse train being comunicated to a signalling device which responds to the mean amplitude of the received pulse.

14. An electric pulse modulator comprising first and second rectifiers in series connection and the same polarity in the series connection, a common lead, a shunt channel bridged across the junction of the two rectifiers and the common lead, an input pulse train source and a first bias source each in series with an impedance and bridged across the junction of the two rectifiers and the common lead, a modulating pulse train source bridged across the junction of the two rectifiers and the common lead, a further bias source having one side connected to the common lead and the other side connected to the end of the first rectifier remote from the second rectifier, and a series channel bridged across the end of the second rectifier remote from the first rectifier and the common channel, the first rectifier and the common channel, the shunt channel receiving a pulse train selected from the modulating pulse train source by the input pulse train source, the received pulse train being demodulated by a low pass filter and being communicated to a signalling device which responds to the mean amplitude of the received pulse, said signalling device comprising a detector circuit comprising a series connection of a rectifier and a parallel circuit of two arms, one arm including a resistor and the other arm a capacitor, the voltage across the parallel circuit comprising the output of the detector circuit and an amplifier for amplifying said output fo said detector circuit.

15. A multi-stage electric pulse modulator comprising a plurality of groups of modulators each of which comprises first and second rectifiers in series connection and the same polarity in the series connection, a common lead, a shunt channel bridged across the junction of the two rectifiers and the common lead, an input pulse train source and a first bias source each in series with an impedance and bridged across the junction of the two rectifiers and the common lead, a further bias source having one side connected to the end of the first rectifier remote from the second rectifier, and a series channel bridged across the end of the second rectifier remote from the first rectifier and the common channel, the E. M. F.'s in the series channel and the further bias source when taken in a circuit including the two rectifiers in series being such at all times as to urge backward current through the rectifiers and in which the resultant current from the shunt channel, the first bias source and the input pulse train source has the polarity of forward current flow through the second rectifier only in the presence of a pulse from the pulse input source, the modulators in a group being parallel connected to the shunt channel of a group modulator, the group modulators being paralel connected to common series channel.

16. A multiplex modulator comprising a plurality of modulators according to claim 1 and in which the plurality of modulators are arranged in a number of groups, each group being connected to a common multiplex channel which forms the series channel for each modulator via a third rectifier in series connection with and of the same polarity in the series connection the paralleled second rectifier of each group.

17. A multiplex modulator comprising a plurality of modulators according to claim 1 and in which the plurality of modulators are arranged in a number of groups, each group being connected to a common multiplex channel which forms the series channel for each modulator via a third rectifier in series connection with, and of the same polarity in the series connection, the paralled second rectifiers of each group, the common multiplex channel containing a common modulator including a pulse train source the pulses of which occur within the duration of the pulses from any of the modulators.

References Cited in the file of this patent

UNITED STATES PATENTS

| | | |
|---|---|---|
| 2,490,026 | Buckbee | Dec. 6, 1949 |
| 2,511,468 | Harrison | June 13, 1950 |
| 2,576,026 | Meacham | Nov. 20, 1951 |
| 2,579,473 | Chatterjea | Dec. 25, 1951 |

FOREIGN PATENTS

| | | |
|---|---|---|
| 516,359 | Great Britain | Jan. 1, 1940 |